United States Patent [19]
Cyphelly

[11] 4,205,821
[45] Jun. 3, 1980

[54] MULTI-WAY ROTARY VALVE FOR A FLUID UNDER PRESSURE

[76] Inventor: Ivan J. Cyphelly, Neuhaus, Hinteregg, Switzerland, 8128

[21] Appl. No.: 934,692

[22] Filed: Aug. 18, 1978

[30] Foreign Application Priority Data

Sep. 2, 1977 [CH] Switzerland .................. 10756/77

[51] Int. Cl.² ........................................ F16K 39/04
[52] U.S. Cl. ................................. 251/160; 251/175; 137/625.46
[58] Field of Search ............... 251/283, 160, 175; 137/625.46

[56] References Cited
U.S. PATENT DOCUMENTS

| | | | |
|---|---|---|---|
| 2,990,853 | 7/1961 | Sharp | 251/283 X |
| 3,768,516 | 10/1973 | Cyphelly | 137/625.46 |

*Primary Examiner*—Arnold Rosenthal
*Attorney, Agent, or Firm*—Browdy and Neimark

[57] ABSTRACT

A multi-way rotary valve for fluid media having a distributor block and rotatable distributor disc, separated therefrom by a gap of variable size and provided with a pintle for rotation is provided with a bleeder throttle having a spring biased ball check valve so that the disc is rotatable when the turning torque is higher than the torque produced by the spring.

4 Claims, 2 Drawing Figures

MULTI-WAY ROTARY VALVE FOR A FLUID UNDER PRESSURE

FIELD OF INVENTION

The invention relates to fluid flow and, more particularly, to a multi-way rotary valve for a fluid medium under pressure.

The invention particularly relates to multi-way rotary valves for a fluid medium, e.g. oil, under pressure, having a distributor block and a rotatable distributor disc provided with a pintle. Between the block and disc is a gap which communicates with an intermediate pressure chamber, one side of which constitutes the wall of the disc opposite the plane of the gap to provide a hydrostatic bearing for the distributor disc. The gap is connectable, via a vent throttle, with a pressure medium at a pressure lower than the intake pressure.

BACKGROUND OF INVENTION

Multi-way rotary valves with hydrostatic bearings having a gap in one plane, require a throttle for venting the intermediate pressure chamber at the side of the distributor disc which is turned away from the gap plane. It is quite usual for additional control tasks to be assigned to this vent throttle, for example, temperature-dependent gap control according to U.S. Pat. No. 3,768,516.

SUMMARY OF INVENTION

The present invention is concerned in particular with the design of the vent throttle and its purpose is to control the distributor gap height influenceable by the vent throttle in such a way that a minimum rotary resistance is provided and, under extreme conditions, e.g. contamination, loss of lubricant, heat deformation, and the like, there is no sticking or wear between the distributor disc and the distributor block.

According to the invention, the multi-way rotary valve is characterized, for this purpose, by the aperture of the venting throttle being designed in such a way that the venting throttle opens at least partially when the distributor disc moves rotationally due to the torque between the pintle and the distributor disc. In this connection, it is advantageous to provide means such that the distributor disc does not rotate until a given threshold value of the aforesaid torque has been reached.

BRIEF DESCRIPTION OF DRAWING

Such an embodiment of the invention will be described hereinbelow with reference to the drawing.

DETAILED DESCRIPTION OF EMBODIMENT

Figure 1:
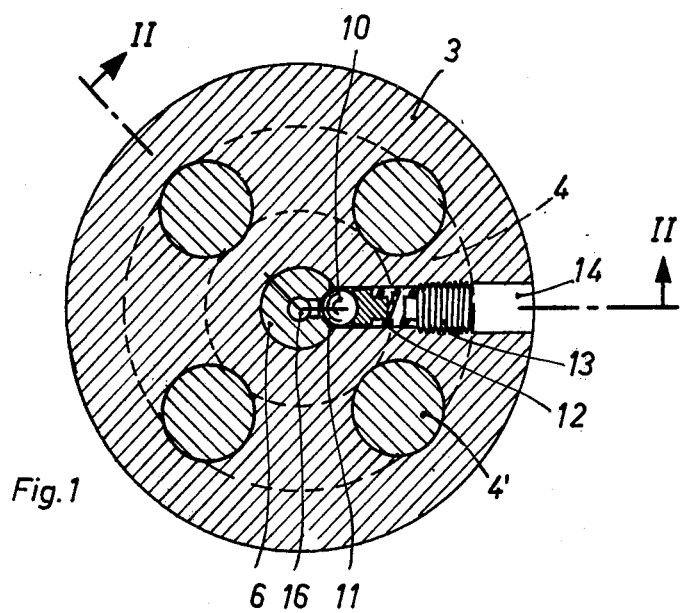
FIG. 1 shows a section through the distributor disc of the rotary valve transverse to the axis of the pintle for the distributor disc, along line I—I in FIG. 2.
Figure 2:
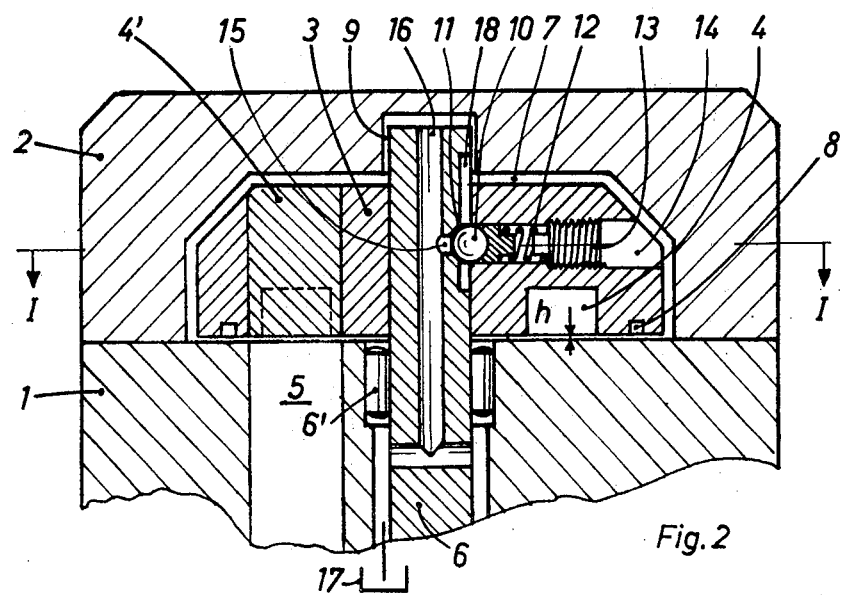
FIG. 2 shows a lengthwise section through the axis of the pintle along line II—II in FIG. 1 and through the other parts of the valve.

The multi-way rotary valve with a hydrostatic bearing shown has, in a known manner according to U.S. Pat. No. 3,768,516, a distributor block 1 with a cover 2 and a distributor disc 3 rotatable with respect to distributor block 1 and cover 2. The distributor disc 3 is provided on its side facing the distributor block 1, which side is spaced by a planar gap h from the surface of distributor block 1, with an annular groove 4 divided into individual segments by plugs 4'. A plurality of axial valve bores 5 are provided in the distributor block 1, only one of which is shown in FIG. 2, and whose radial positions are such that they align lengthwise with the annular groove 4. A pintle 6 is provided for rotating distributor disc 3, which pintle is rotationally displaceably mounted in distributor block 1 by means of a bearing 6'. The pintle 6 is not rigidly connected with distributor disc 3, but rotatable with respect thereto; accordingly a device described below serves to transmit torque from the pintle 6 to the distributor disc 3.

Between the cover 2 and the distributor block 1 is provided an intermediate pressure chamber 7. This chamber 7 is supplied with fluid by an annular groove 8 via the radially outermost region of gap h between distributor block 1 and disstributor disc 3, and the annular groove 8, in turn, is supplied with the pressure medium at the intake pressure via a line, not shown. By means of the anular groove 9 between the pintle 6 and the cover 2, acting as a vent throttle for the intermediate pressure chamber 7, gap adjustment and hence hydrostatic positioning of the distributor disc 3 are produced in known fashion. The annular groove 9 is connected with a pressure medium tank 17 via a lenghtwise extending bore 16 in the pintle 6, in which tank 17 the pressure medium has a lower pressure than the aforesaid intake pressure.

In order to transmit the torque from the pintle 6 to the distributor disc 3, a ball check valve is provided, the ball 10 of which is guided by the distributor disc 3, and the ball seat 11 of which is provided in the pintle 6. Ball 10 is subject to the pressure of a spring 12, the pretensioning of which is adjustable by means of a threaded bolt 13. As can be seen, the ball 10, spring 12, and threaded bolt 13 are disposed in a cross bore 14 of the distributor disc 3. The ball seat is connected via a cross bore 15 in the pintle 6 with the lengthwise bore 16 through the pintle 6 and hence with the tank 17. Moreover, the pintle 6 is provided with a lengthwise extending milled section 18 in which ball seat 11 is located and which extends as far as the intermediate pressure chamber 7.

During operation of the rotary valve shown, gap h between the distributor disc 3 and the distributor block 1 is adjusted in known fashion by feeding the pressure medium at a high pressure in the groove 8, and then to the intermediate pressure chamber 7, and the annular groove 9, which groove 9 is provided as a vent throttle, whereby when the pintle 6 is rotated to adjust the valve, the distributor disc 3 is entrained by ball 10 located in ball seat 11 when the turning of pintle 6 does not cause the torque created by spring 12 and threaded bolt 13 to be exceeded. If the set torque created by the spring 12 is exceeded, however, because the distributor disc 3 offers a greater resistance to rotational movement, then ball 10 rises out of its seat 11. This opens a throttle path in parallel with annular groove 9 via the milled section 18 of the pintle 6, which path correspondingly causes the gap h to enlarge. The leaked fluid then flows through bore 16 and pintle 6 back to the tank 17. Gap h will continue to enlarge until the friction between the distributor disc 3 and the distributor block 1 corresponds to the torque imposed by the pretensioning of the spring 12. If this friction is caused by contaminants in the valve plane, the additional throttling produced by ball 10 will create a gap h sufficient so that the contaminants are flushed out. Hence, this design combines bleed throttling with the manual flushing known from traditional rotary valves.

The bleeder throttle in the annular gap 9 can be sealed in a version of the present multi-way rotary valve so that gap h is caused almost to disappear when the rotary valve is at rest; in this case, the rotary valve operates without leakage. If it is now desired to rotate the distributor disc 3, the torque-sensitive bleeder throttle between distributor block 1 and distributor disc 3, namely the throttle path of the milled section 18 of the pintle 6, causes the distributor disc 3 to lift only during movement and, indeed, the gap formed is only such as to correspond to the set torque as a result of mixed friction. Hence, this torque-sensitive throttle as the sole vent of intermediate pressure chamber 7, will produce a sealed plate valve with the predetermined actuating torque which covers a broad field of application in other media than oil such as water, water-oil emulsions, air, etc.

It will be obvious to those skilled in the art that various changes may be made without departing from the scope of the invention and the invention is not to be considered limited to what is shown in the drawing and described in the specification.

What is claimed is:

1. In a multi-way rotary valve for a pressure medium under intake pressure, comprising a distributor block, a distributor disc spaced from said block by a gap and being rotationally displaceable relative to said block, a pintle for said disc, the gap between said distributor block and distributor disc communicating with an intermediate pressure chamber on the side of the distributor disc opposite the gap for the purpose of providing hydrostatic positioning of the distributor disc, and a bleeder throttle with a pressure medium at a pressure less than the intake pressure connectable with the intermediate pressure chamber, the improvement wherein:

the cross section of the bleeder throttle being such that the bleeder throttle opens at least partially when the distributor disc effects a rotary movement caused by the torque between said pintle and said distributor disc, and including means to bring about rotary movement of the distributor disc only when a preset threshold valve of the torque between the pintle and disc has been exceeded, and wherein said bleeder throttle comprises at least one check valve having a valve component biased by a spring, said valve being guided by the distributor disc and having a valve seat in said pintle, said valve being connected via channel in said pintle with the lower-pressure pressure medium, said spring which tensions said valve component of said check valve being adjustable in order to adjust the threshold valve of the torque.

2. A multi-way rotary valve according to claim 1, wherein said pintle has a recess containing said valve seat of said check valve, which recess extends as far as the intermediate pressure chamber.

3. A multi-way rotary valve according to claim 2, wherein said check valve is a ball check valve including a ball, and said valve component is said ball.

4. A multi-way rotary valve according to claim 1, wherein said check valve is a ball check valve including a ball, and said valve component is said ball.

* * * * *